United States Patent [19]
Ribka et al.

[11] 3,785,843
[45] Jan. 15, 1974

[54] PROCESS FOR IMPROVING A DISAZO PIGMENT

[75] Inventors: Joachim Ribka, Offenbach am Main; Siegfried Schwerin, Hofheim, Taunus, both of Germany

[73] Assignee: Farbwerke Hoechst Aktiengesellschaft vormals Meister Lucius & Bruning, Frankfurt am Main, Germany

[22] Filed: Dec. 2, 1971

[21] Appl. No.: 204,371

[30] Foreign Application Priority Data
Dec. 4, 1970    Germany .................... P 20 59 675.2

[52] U.S. Cl. ............................. 106/288 Q, 106/309
[51] Int. Cl. .............................................. C08h 17/14
[58] Field of Search .................... 106/288 Q, 308 Q, 106/309; 260/176

[56] References Cited
UNITED STATES PATENTS
3,661,611   5/1972   Dawson et al. ................ 106/308 Q
3,655,641   4/1972   Hamilton ........................... 260/176

*Primary Examiner*—James E. Poer
*Assistant Examiner*—Jacqueline V. Howard
*Attorney*—Henry W. Koster

[57] ABSTRACT

A process for improving the properties of Pigment Yellow 17 (Colour Index 21 105) wherein an aqueous suspension of the crude dyestuff prepared in the usual manner by coupling tetrazotized 4,4'-diamino-3,3'-dichloro-diphenyl with 1-acetoacetylamino-2-methoxy-benzene is heated for several hours to temperatures between 100° and 200°, preferably 100°C to 150°C, at a pH-value higher than 8, preferably at about 11. Pigment Yellow 17 after-treated in this way has an essentially better fastness to light than the untreated pigment. Furthermore, the graphic prints produced with it have a higher lustre.

3 Claims, No Drawings

PROCESS FOR IMPROVING A DISAZO PIGMENT

One of the most important yellow pigments in the printing industry is Pigment Yellow 17 (Colour Index 21 105), which is obtained by coupling tetrazotized 4,4'-diamino-3,3'-dichloro-diphenyl with 1-acetoacetylamino-2-methoxybenzene. This pigment is distinguished by a high tinctorial strength and a very good fastness to solvents and is therefore in this respect superior to the yellow monoazo dyestuffs which are obtained by coupling diazotized anilines with N-acetoacetyl-anilines. Furthermore, Pigment Yellow 17 yields a very pure, somewhat greenish shade and is therefore excellently suited for the manufacture of multicolor prints. However, in comparison to the afore-mentioned yellow monoazo dyestuffs, it has a poorer fastness to light which makes it impossible to use it in many fields of application. Hence, for the printing ink industry a pigment would be of great importance which has a better fastness to light as compared to that of Pigment Yellow 17 with the same tinctorial strength and good fastness to solvents.

Now, it has been found that Pigment Yellow 17 having improved properties regarding its industrial application is obtained by subjecting the disazo pigment prepared in the usual manner to an additional treatment in an alkaline medium at an elevated temperature. For carrying out the process of the invention, an agent having an alkaline action, preferably a sodium hydroxide solution, is added to the aqueous suspension of the disazo dyestuff prepared in the usual manner by coupling tetrazotized 4,4'-diamino-3,3'-dichloro-diphenyl with 1-acetoacetylamino-2-methoxy-benzene in such a quantity as to increase the pH-value to more than 8, preferably to about 11, and the suspension is then heated for several hours to temperatures ranging of from 100° to 200°C, preferably 100°C to 150°C. The process may also be carried out by first isolating the disazo dyestuff prepared by coupling in known manner, then stirring into water and rendering it alkaline and heating the whole in the same way.

The process of the invention is preferably carried out in the presence of water; other organic, water-miscible or non-water-miscible solvents, optionally with addition of anion-active or cation-active or non-ionogenic dispersing agents, may also be used. Such solvents are for example lower aliphatic alcohols, ketones, halogenated hydrocarbons or substituted and unsubstituted aromatic hydrocarbons.

It is surprising that under these conditions the carboxylic acid amide groups contained in the dyestuff are not saponified. This stability is the more surprising and could not have been forseen, as the 1-acetoacetylamino-2-methoxybenzene used as the coupling component is very rapidly destroyed. It is therefore a further advantage of the process of the invention that the alkaline after-treatment results in a purification of the pigment by the destruction of the 1-acetoacetylamino-2-methoxybenzene, which is always used in excess during coupling. By this destruction of 1-acetoacetylamino-2-methoxybenzene, o-anisidine is formed. It is therefore suitable to render acidic by addition of a mineral acid the reaction mixture after the alkaline after-treatment and to wash out the o-anisidine in the form of its salt with water.

The Pigment Yellow 17 after-treated according to the process of the invention is distinguished from the untreated pigment by an essentially better fastness to light of the graphic prints produced with it. Furthermore, the graphic prints produced with the after-treated pigment are distinguished by a higher lustre than corresponding prints made with the untreated pigment.

The following Examples illustrate the invention:

EXAMPLE 1

65 Parts by weight of 1-acetoacetylamino-2-methoxybenzene were dissolved in 1,200 parts by volume of water and 45 parts by volume of a 33 percent sodium hydroxide solution at room temperature. After addition of 16.5 parts by weight of resin soap having a strength of 50 percent in 100 parts by volume of water, the 1-aceto-acetylamino-2-methoxybenzene was precipitated with 33 parts by volume of glacial acid. Coupling was then effected in the course of 2 hours at room temperature with a solution of tetrazotized 4,4'-diamino-3,3'-dichloro-diphenyl which had been prepared by the addition of 60 parts by volume of a 5N-sodium nitrite solution to a mixture of 38 parts by weight of 4,4'-diamino-3,3'-dichloro-diphenyl, 183 parts by volume of 5N-hydrochloric acid and 520 parts by volume of water. When coupling was completed, the dyestuff suspension was heated to 90°C and kept for 30 minutes at this temperature.

The coupling mixture was then adjusted to a pH-value of 11 by means of 77 parts by weight of a 33 percent aqueous sodium hydroxide solution and heated for 4 hours to 125° C in an autoclave provided with a stirrer. The dyestuff suspension was then adjusted to pH 2 – 3 with 70 parts by weight of aqueous hydrochloric acid having a strength of 37 percent, stirred for 1 hour, filtered, washed until neutral and dried at 60°C.

A pigment dyestuff was obtained which, when incorporated into a graphic printing ink, yielded yellow prints which were distinguished over prints produced with untreated Pigment Yellow 17 by an essentially better fastness to light, a higher lustre and a clearer shade.

EXAMPLE 2

The pigment dyestuff prepared according to Example 1 from 65 parts by weight of 1-acetoacetylamino-2-methoxybenzene and 38 parts by weight of 4,4'-diamino-3,3' -dichloro-diphenyl was suction-filtered after having been heated to 90° C and washed to neutrality. The press-cake was stirred with water and, after addition of 44 parts by weight of a 33 percent sodium hydroxide solution, it was heated for 4 hours to 125° C in an autoclave provided with a stirrer. The dyestuff suspension was then adjusted to a pH-value of 2 – 3 by means of 40 parts by weight of hydrochloric acid having a strength of 37 percent, stirred for 1 hour, filtered, washed to neutrality and dried at 60° C. A pigment dyestuff was obtained which had the same tinctorial properties as the dyestuff prepared according to Example 1.

We claim:

1. Process for improving the properties of Pigment Yellow 17 with regard to its industrial application, wherein the pigment is after-treated by heating to temperatures in the range of from 100°C to 200°C in an alkaline medium at a pH-value higher than 8.

2. A process as claimed in claim 1 wherein the after-treatment is performed at a temperature of from 100° to 150°C, at a pH-value of 11.

3. Pigment Yellow 17, whenever after-treated by a process as claimed in claim 1.

* * * * *